July 26, 1960 W. R. JENSEN 2,946,412
LIQUID COOLED HYDRAULICALLY ACTUATED BRAKE
Filed Sept. 17, 1956

Inventor:
Warren R. Jensen
By Gary, Desmond & Parker
Attys.

൧

2,946,412

LIQUID COOLED HYDRAULICALLY ACTUATED BRAKE

Warren R. Jensen, Bridgeport, Conn., assignor to Raybestos-Manhattan, Inc., Passaic, N.J., a corporation of New Jersey Filed Sept. 17, 1956, Ser. No. 610,202

5 Claims. (Cl. 188—264)

This invention relates to improvements in an hydraulic control valve and hydraulic system for liquid cooled brakes wherein the cooling liquid is employed both to cool the brakes and furnish the brake applying pressure.

In liquid cooled brakes it has been found that more efficient cooling can take place when the liquid coolant in the brakes is under relatively high pressure. In addition, hydraulic brakes can be designed and constructed to apply predetermined braking forces for predetermined liquid pressure in the hydraulic braking system. In addition, it is known that heat developed at the braking surfaces is a function of the braking force which in turn, in an hydraulic brake, is a function of the pressure of the braking liquid. Hence, the need for pressure on the liquid as a coolant occurs when the liquid employed for establishing braking increases in pressure.

The present invention contemplates an hydraulic braking system including a control valve therefor which is ideally adapted to control and distribute the force-producing coolant liquid in a braking arrangement wherein the braking fluid is used both as a force-producing agent and a coolant.

The present invention is also characterized by an hydraulic arrangement and control valve whereby an adequate volume of liquid is always maintained in the braking system.

Other objects and advantages of the present invention will be apparent from the accompanying drawings and following detailed description.

Figure 1:
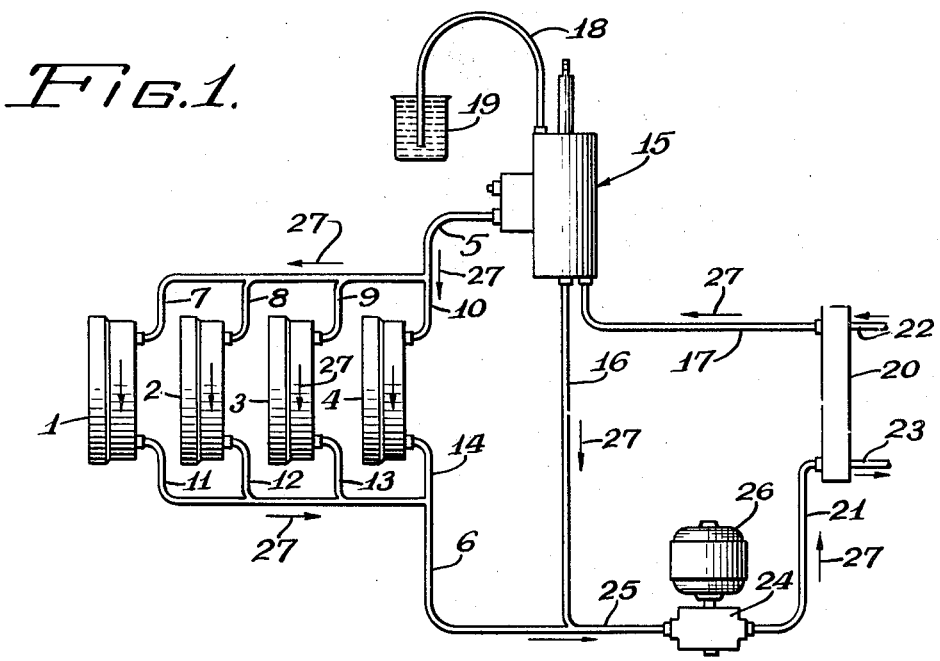
Fig. 1 is a diagrammatic view of the braking system comprising the present invention.

Referring in detail to the drawings, 1, 2, 3 and 4 indicate four brakes of an automobile or airplane. The brakes, shown diagrammatically, are of the hydraulic liquid cooled type, that is, hydraulic fluid is employed as the force-producing agency in applying the brakes and also the same hydraulic fluid is employed to cool the braking elements. The brakes 1 to 4 inclusive are connected in parallel to a hydraulic piping circuit 5 and 6, being respectively the inlet and outlet pipes comprising the circuit. Branch inlet pipes 7, 8, 9 and 10 connect the inlet pipe 5 to the inlet sides of the brakes 1, 2, 3 and 4 and branch outlet pipes 11, 12, 13 and 14 connect the outlet side of each of the brakes 1, 2, 3 and 4, respectively, to the outlet pipe 6.

A combination valve and brake actuator 15 is connected to the brake inlet pipe 5. A by-pass pipe 16 also connects into the actuator as does an actuator inlet pipe 17. An overflow pipe 18 also connects at one end into the actuator and at the other end connects into a liquid reservoir 19 which carries a reserve supply of liquid open to atmospheric pressure.

The actuator inlet pipe 17 comprises the outlet pipe of a heat exchanger 20 of a conventional type, said heat exchanger being connected to an exchanger inlet pipe 21. Pipes 22 and 23 also connect into the heat exchanger 20 whereby cooling liquid may be circulated through the heat exchanger in heat exchange relationship with the liquid which may be circulated therethrough from the braking system. If desired, the heat exchanger may comprise the usual honeycombed radiator whereby the brake liquid may be cooled by the passage of air through the radiator.

The heat exchanger inlet pipe 21 may be connected to the discharge side of a pump 24, the inlet side of which is connected to pump inlet pipe 25, the opposite end of which connects to both by-pass pipe 16 and brake outlet pipe 6. An electric motor 26 functions to drive pump 24 whereby the brake liquid may be circulated through the system hereinbefore described as indicated by the arrows 27.

Figure 2:
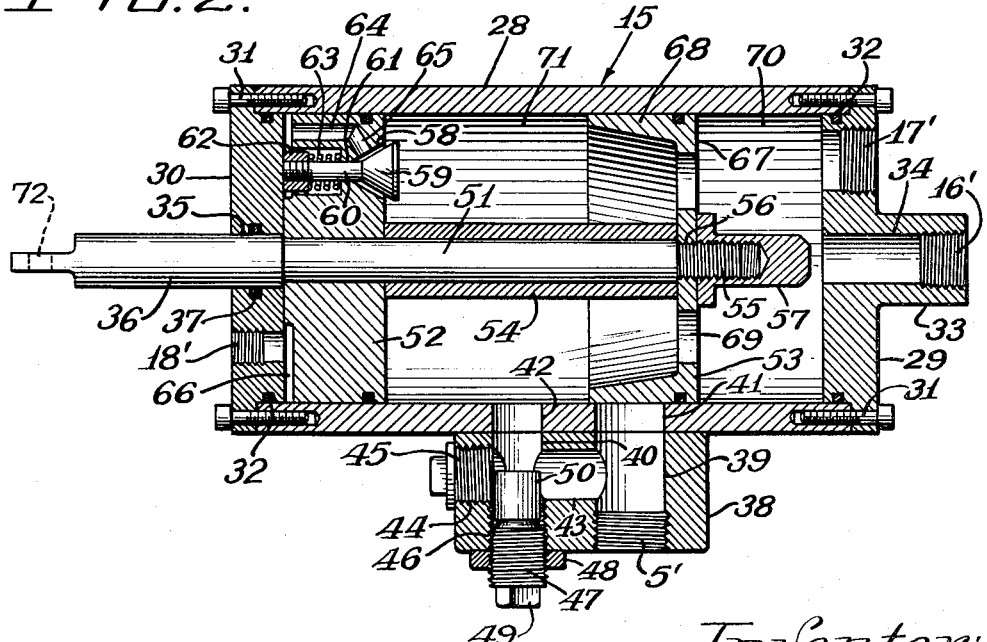
Fig. 2 is an enlarged longitudinal sectional view of the control valve employed in the system illustrated in Fig. 1.

Referring in detail to Fig. 2, the combination valve and brake actuator 15 is shown in enlarged section. The device 15 comprises a cylindrical body 28 closed at one end by a bottom closure plate 29 and at the opposite end by a top closure plate 30. The plates 29 and 30 are secured to the cylindrical body 28 by screws 31 which pass through the respective plates and are threaded into the walls of the body 28. Sealing rings 32 effectively render the plates liquid-tight relative to the body 28.

The bottom plate 29 carries a central outwardly extending boss 33 which is provided with a cylindrical bore 34, the outer end of which carries internal threads 16'. The bottom plate 29 is also provided with an internally threaded opening 17'. The internally threaded portion 16' is adapted for connection with one end of the by-pass pipe 16 and the internally threaded aperture 17' is adapted for connection to one end of the actuator inlet pipe 17. The top closure plate 30 is provided with an internally threaded aperture 18' which is adapted to be connected to the overflow or reservoir pipe 18. The top plate 30 is also provided with a substantially centrally disposed aperture 35 through which an actuator rod 36 is slidably positioned, the plate carrying a sealing ring 37 whereby leakage is prevented along the rod 36.

A block 38 is secured to a lateral wall of the cylindrical body 28, said block being provided with a relatively enlarged bore 39 and a substantially parallel relatively restricted bore 40. The lateral wall of the body 28 is provided with an aperture 41 which connects with the bore 39 and said lateral wall is also provided with an aperture 42 which connects with bore 40. The block 38 is also provided with a transverse bore 43 which connects an intermediate portion of bore 39 with an intermediate portion of bore 40. The bore 43 extends to the outer face of the block and is provided with internal threads 44 in which an externally threaded plug 45 is positioned. The bore 39 also extends to a face of the block and is provided with internal threads 5'. In similar fashion the bore 40 extends to a face of the block and is provided with internal threads 46. A flow-adjusting member 47 is adapted to be threadedly positioned in the threaded end of bore 40, said flow adjusting member being engaged with a lock nut 48 and being provided at its outer end with a square sectioned head 49 whereby the adjusting member may be rotated by means of a conventional wrench or the like. The inner portion 50 of the adjusting member 47 extends inwardly into bore 40 and also is adapted to transversely adjustably obstruct bore 43. The internal threads 5' of bore 39 are adapted to be connected to the brake inlet pipe 5.

The actuator rod 36, within the body 28, has a restricted diameter portion 51. At one end of the portion of restricted diameter a piston 52 is carried. Adjacent the opposite end portion of the member 51 a valve element 53 is carried, the valve element 53 being spaced from the piston 52 by means of spacing collar 54. The restricted diameter portion of the actuator rod 36 terminates in a threaded stud 55 which freely passes through a central aperture 56 provided in the valve element 53. A valve tip 57 is threadedly positioned upon the stud 55 and functions to hold the valve element 53 in abutting relationship with respect to the spacer 54. The valve tip 57 extends outwardly from the valve element 53 and is in coaxial relationship with respect to the bore 34. As will be hereinafter more fully described, the valve tip 57, under predetermined circumstances, moves into the bore 34 and functions to isolate by-pass pipe 16 from the system.

The piston 52 is provided with a conical valve seat 58 upon which a conical valve 59 is adapted to cooperate. The valve 59 is carried by a shank 60 which extends through an aperture 61 provided in the piston 52. The end of the shank 60 is threaded and is engaged with a nut 62. A coil spring 63 embraces the shank 60 and functions to normally seat the valve 59 upon the valve seat 58.

A bore 64 is provided in the piston 52, adjacent and substantially parallel to the shank 60, said bore being provided with a connecting bore 65 which opens at the valve seat 58. The piston 52 is milled at its rear face whereby an annular space 66 is provided between the piston and the top closure plate 30 when the rod 36 is fully retracted from the body 28.

The valve element 53 comprises a web portion 67 and an annular flange portion 68. The web portion 67 is provided with a plurality of apertures 69 whereby communication is established between zone 70, adjacent the lower face of the web 67 and a zone 71 provided between the valve element 53 and the piston 52.

The arrangement is such that when piston rod 36 is moved inwardly with respect to the cylindrical body 28, the valve tip 57 enters the bore 34 and functions to isolate the by-pass pipe 16. The shank 60 carrying the valve 59 is of such length that when the rod 36 is fully retracted from the body 28 the nut 62 abuts the inner face of the top closure 30 and unseats the valve 59. When, however, the rod 36 moves inwardly with respect to the body 28, the coil spring 63 causes the valve 59 to firmly seat upon the seat 58. It will also be noted that when the piston 52 is in contact with the top closure plate 30 and valve 59 is unseated, that communication is estabished between the zone 71 and the annular space 66 through the bores 64 and 65 and hence the zone 71 is in communication with the reservoir pipe 18.

The valve element 53 is so positioned upon the restricted portion 51 of the rod 36 that when said rod is fully retracted from the body 28 the annular flange 68 closes communication between the bore 39 and the interior of the body 28. Hence, when the piston rod 36 is fully retracted, communication between the brake inlet pipe 5 and the interior of the actuator is broken.

In the operation of the present invention, the end of the rod 36 may be provided with an eye 72 which, in turn, may be connected directly or through a suitable linkage to to brake actuating pedal or lever (not shown). The motor 26 is adapted for continuous operation and the pump is of such capacity as to maintain a desired continuous flow of liquid in the system either through the brake branch of the system or through the by-pass branch of the system or both.

With the motor 26 in operation and the brake pedal or lever released, the rod 36 is in fully retracted position with respect to the body 28. Hence, valve tip 57 will be retracted from bore 34 and flange 68 of the valve element 53 will fully close bore 39. Bore 40, however, will remain open and zone 71 will be in communication with reservoir 19 since valve 59 will be unseated.

The capacity of pump 24 is not sufficient to stablish sufficient pressure in zone 71 to cause said liquid to discharge into reservoir 19, but is sufficient to cause circulation through heat exchanger 20, by-pass pipe 16, and through brakes 1, 2, 3 and 4. The major flow, however, will take place through by-pass pipe 16 since the area of discharge through this pipe is greater than the area of discharge through bore 42 in body 28 and bores 40 and 43 in block 38 particularly in view of the throttling effect of flow adjustment member 47. The flow adjustment member 47 is so adjusted as to permit just sufficient flow through the brake branch of the system as to keep said system completely filled with liquid and devoid of air. Of course, this flow can be augmented in the event that it is desired to employ the cooling effect of the flowing liquid when the brakes are not applied. However, the pressure within the brakes is never permitted to be such as to cause, per se, the application of the brakes or to cause dragging thereof.

When the brake pedal or lever is actuated, the rod 36 moves inwardly into the actuator and immediately upon such inward movement valve 59 seats under the influence of spring 63 since abutment nut 62 moves away from the inner wall of top closure plate 30. The valve tip 57 then moves into bore 34 and thereby by-pass pipe 16 is segregated from the system. Liquid pressure is thus established in the zones 70 and 71 and inasmuch as flange 68 has uncovered bore 39 pressure is established in the brakes. Of course, substantially the same liquid pressure is transmitted from the zones 70 and 71 to both sides of the pump 24 and, hence, the pump pressure necessary to circulate the liquid through the system remains substantially the same.

However, the static pressure established by the movement of the piston 52 pressurizes the liquid in the brakes sufficient to actuate the brakes in substantial proportion to the force applied to the brake pedal or lever. As the brakes are applied energy is dissipated at the surfaces of the brake elements and the heat thus formed is transferred to the liquid being circulated by the pump 24. The flowing liquid which absorbs the generated heat is passed through the heat exchanger 20 and is cooled before it again passes through the brakes.

In the application for patent filed by Sanford and Eames, Serial No. 503,864, filed April 26, 1955, and now Patent No. 2,889,897, it was found that in liquid cooled brakes, heat is generated at the surfaces of the braking elements at such a rapid rate, that substantially regardless of the rate of flow of coolant, at least for brakes of a size practical for mobile vehicles, steam was generated at the interface of the coolant and cooled braking element. Further, that upon the inception of the formation of steam the coolant loses a large percentage of its cooling effect due, it is thought, to the formation of a layer of steam bubbles adjacent the face of the cooled brake element which virtually insulates said face from the body of coolant proper. It has been proposed in the patent application, aforesaid, to inhibit the formation of steam and the consequent insulating layer of bubbles, by pressurizing the coolant to a relatively high value, up to 500 pounds per square inch, or higher.

Hence, in the present invention, the pressure established upon the liquid in the brakes 1, 2, 3, and 4 by the actuation of the rod 36 not only supplies the force for applying the brakes, but pressurizes the liquid and thus renders it more effective as a coolant.

In addition, by the provision of the controlled bores 40 and 43 the brakes will always be filled with a circulating liquid even when the brakes are not applied by the pedal or lever and, hence, the brake system will be devoid of air pockets or bubbles and the liquid will be available for substantially immediate actuation of the brakes.

Further, if after prolonged or repeated application of the brakes, the total liquid volume in the system tends to increase due to the heating of the liquid, such excess volume may escape to the reservoir since the force of such expansion may tend to oppose the pedal pressure and move the piston 52 in opposition to the actuating movement of the rod 36 until piston 52 abuts plate 30 at which time valve 59 will be unseated.

In addition, as the liquid in the system cools, the pressure within the system will decrease and, hence, liquid will be transferred from the reservoir 19 to the system due to the reduced pressure or vacuum established in zone 71.

Although the heat exchanger 20 is shown as being interposed between the actuator 15 and pump 24, it may be positioned between the brakes and the pump, specifically in pipe 6. It is apparent that if the pump 24 is connected on the discharge side of the heat exchanger 20, the temperature of the liquid handled by the pump will be lower than it would be were the pump connected on the inlet side of the heat exchanger. In some instances this may be advantageous. However, where the heat exchanger is connected on the discharge side of the pump, as shown, the entire volume of liquid in the system would be passed through the heat exchanger even when the brakes are not applied. In some instances this may be of greater advantage than the other placement of the heat exchanger herein described. However, either placement is contemplated.

It is preferable that the actuator 15 be positioned at a lower level than reservoir 19 so that the normal pump pressure will not discharge liquid from the actuator to the reservoir when the brake pedal or lever is released and valve 59 is unseated. That is, the pump capacity will be such as not to establish enough pressure in the zone 71 when the by-pass 16 is open to discharge liquid through valve 59.

Modifications of the present invention will suggest themselves to those skilled in the art which do not depart from the spirit of the invention, and, hence, it is not intended that the invention be limited to the precise details shown and described except as necessitated by the appended claims.

I claim as my invention:

1. An hydraulic system for liquid cooled hydraulic brakes which comprises, an endless pipe circuit for liquid, a liquid cooled hydraulic brake connected in said circuit, means in said circuit for circulating liquid therein, a heat exchanger connected in said circuit, an actuator connected in said circuit, and a normally open by-pass pipe connecting said actuator to the inlet of said circulating means, said pipe by-passing substantially all of the liquid in said circuit around said brake when said actuator is not being operated, said actuator including means for decreasing the volumetric capacity of said circuit to thereby substantially statically pressurize the liquid in said circuit, means for closing said by-pass pipe when the liquid in said circuit is statically pressurized by said volumetric capacity reducing means, and means for permitting circulation of substantially all of the liquid in said circuit through said brake connecting means when said by-pass pipe is closed.

2. An hydraulic system for liquid cooled hydraulic brakes which comprises, a closed pipe circuit for liquid, a liquid cooled hydraulic brake connected in said circuit, means in said circuit for circulating liquid therein, a heat exchanger connected in said circuit, a cylinder connected in said circuit, a piston movable in said cylinder, actuation of said piston substantially statically pressurizing all of the liquid in said circuit, a normally open by-pass pipe connecting said cylinder to the inlet of said circulating means, said pipe by-passing a major portion of the liquid in said circuit around said brake when said piston is not being actuated, and means carried by said piston in said cylinder for closing said by-pass pipe when the piston is being actuated, said cylinder and piston including means for permitting circulation of substantially all of the liquid in said circuit through said brake connecting means when said by-pass pipe is closed.

3. An hydraulic system for liquid cooled hydraulic brakes which comprises, an endless closed pipe circuit for liquid, a liquid cooled hydraulic brake connected in said circuit, means in said circuit for circulating liquid therein, a heat exchanger connected in said circuit, a cylinder connected in said circuit, a piston movable in said cylinder, actuation of said piston substantially statically pressurizing all of the liquid in said circuit, a normally open by-pass pipe connecting said cylinder to the inlet of said circulating means, said pipe by-passing a major portion of the liquid in said circuit around said brake when said piston is not being actuated, means carried by said piston in said cylinder for closing said by-pass pipe when the piston is being actuated, a separate liquid reservoir open to the atmosphere, means connecting said cylinder and said reservoir, and normally closed valve means carried by said piston for connecting the interior of said cylinder to said reservoir connecting means when the piston is not being actuated, said cylinder and piston including means for permitting circulation of substantially all of the liquid in said circuit through said brake connecting means when said by-pass pipe is closed.

4. The combination with a hydraulic system for liquid cooled hydraulic brakes which includes a closed pipe circuit for liquid, a plurality of liquid cooled hydraulic brakes connected in parallel in said circuit, means for circulating liquid in said circuit, and a heat exchanger connected in said circuit, of an actuator for said system, said actuator comprising a cylinder, means for connecting said cylinder to said circulating means, means for connecting said cylinder to said brakes, a normally open by-pass pipe connecting said cylinder to the inlet of said circulating means, a piston movable in said cylinder, actuation of said piston pressurizing all of the liquid in said circuit, said pipe by-passing substantially all of the liquid in said circuit around said brakes when said piston is not being actuated, means carried by said piston for closing said by-pass pipe when the piston is actuated to pressurize the liquid in said circuit, said cylinder and piston including means for permitting circulation of substantially all of the liquid in said circuit through said brake connecting means when said by-pass pipe is closed, and means carried by said piston for restricting passage of liquid through said brake connecting means when the piston is not being actuated, said restricting means being moved to unrestricting position with respect to said brake connecting means when said piston is actuated to pressurize the liquid in said circuit whereby substantially all of the pressurized liquid is passed to said brakes.

5. A hydraulic system for liquid cooled hydraulic brakes which comprises, an endless closed pipe circuit for liquid cooled hydraulic brake connected in said circuit, means in said circuit for circulating liquid therein, a heat exchanger connected in said circuit, a cylinder connected in said circuit, a piston movable in said cylinder, actuation of said piston substantially statically pressuring all of the liquid in said circuit, a normally open by-pass pipe connecting said cylinder to the inlet of said circulating means, said pipe by-passing a major portion of the liquid in said circuit around said brake when said piston is in substantially retracted position in said cylinder, means connecting said cylinder to said brake, closure means carried by said piston for restricting the passage of liquid through said brake connecting means when the piston is in substantially retracted position in said cylinder, said closure means carried by said piston being moved to unrestricting position with respect to said brake connecting means when the piston is moved to pressurize the liquid in said circuit, separate means carried by said piston for closing said by-pass pipe when the piston is moved to pressurize the liquid in said circuit, said cylinder and piston including means for permitting the circulation of substantially all of the liquid in said circuit through said brake connecting means when said by-pass pipe is closed.

References Cited in the file of this patent

UNITED STATES PATENTS

| | | |
|---|---|---|
| 1,723,032 | Harrington | Aug. 6, 1929 |
| 2,406,304 | Levy | Aug. 20, 1946 |
| 2,742,982 | Hembold | Apr. 24, 1956 |
| 2,821,272 | Sanford et al. | Jan. 28, 1958 |

FOREIGN PATENTS

| | | |
|---|---|---|
| 1,001,791 | France | Oct. 24, 1951 |
| 239,475 | Great Britain | Dec. 11, 1924 |